United States Patent

[11] 3,532,195

| [72] | Inventors | Gerald R. Miller<br>Northville;<br>James Oldham, Dearborn, Michigan |
|---|---|---|
| [21] | Appl. No. | 785,874 |
| [22] | Filed | Dec. 23, 1968 |
| [45] | Patented | Oct. 6, 1970 |
| [73] | Assignee | Ford Motor Company<br>Dearborn, Michigan<br>a corporation of Delaware |

[54] HYDRAULIC SHOCK ABSORBER WITH TEMPERATURE RESPONSIVE VALVE
4 Claims, 1 Drawing Fig.

[52] U.S. Cl. .................................................. 188/277, 137/468
[51] Int. Cl. .................................................. F16f 9/52
[50] Field of Search ............................................. 188/100(B); 137/468

[56] References Cited

UNITED STATES PATENTS

| 1,948,008 | 2/1934 | Rossman | 188/100X |
| 2,264,111 | 11/1941 | Briggs | 188/100X |
| 2,310,570 | 2/1943 | Briggs | 137/468X |
| 2,997,291 | 8/1961 | Stultz | 188/88X |

FOREIGN PATENTS

| 1,133,490 | 11/1956 | France | 188/100(B)UX |

*Primary Examiner*—George E. A. Halvosa
*Attorney*—John R. Faulkner and Clifford L. Sadler

ABSTRACT: A hydraulic shock absorber for a motor vehicle which, in its presently preferred embodiment, has a piston with a rebound passage sealed by a bimetal disc. The disc acts as a valve element and is urged to a closed position by a coil spring. The disc is temperature responsive and constructed to supplement the force of the coil spring tending to seal the rebound port when the temperature within the shock absorber increases and the viscosity of the fluid therein decreases.

Patented Oct. 6, 1970

3,532,195

INVENTORS
JAMES OLDHAM
GERALD R. MILLER
BY John R. Faulkner
Clifford L. Sadler
ATTORNEYS

HYDRAULIC SHOCK ABSORBER WITH TEMPERATURE RESPONSIVE VALVE

BACKGROUND OF THE INVENTION

Energy is absorbed in a hydraulic shock absorber by forcing fluid through restricted control orifices, some of which may have spring pressed valve elements normally closing them. Resistance to relative movement of the shock absorber components is dependent, in part, upon the viscosity of the fluid within the shock absorber, the size of the restricting orifices and the rate of any springs that are employed to seal the orifices within the unit.

A hydraulic shock absorber for a motor vehicle should be constructed to perform effectively in extremes of climatic and operating conditions that effect the viscosity of the fluid. It must be able to perform properly whether the ambient temperature is a −20° or 100°. In addition, the operation of the shock absorber itself creates heat as energy is dissipated thereby causing the temperature within the unit to rise well above the ambient. This is particularly likely to occur when a vehicle is driven over a gravel road having a washboard surface.

Viscosity of hydraulic fluid and, therefore, the performance of a conventional shock absorber varies greatly as a result of temperature changes within the unit. At a high temperature, the fluid has a low viscosity which reduces the ability of the shock absorber to dampen relative movement between vehicle suspension components. The thinner fluid passes through the restricted orifices within the shock absorber more readily as compared with the flow of the same fluid at a low temperature and corresponding high viscosity.

In view of the state of the art, therefore, it is a principal object of the present invention to provide a shock absorber structure that automatically makes compensating changes in the valving resistance in response to temperature changes whereby the unit has consistant damping characteristics over a wide range of operating conditions.

BRIEF SUMMARY OF THE DISCLOSURE

In accordance with the presently preferred embodiment of this invention, a hydraulic shock absorber is provided with a valved and ported piston that separates jounce and rebound chambers. The piston has rebound ports for the controlled flow of fluid from the rebound chamber to the jounce chamber during a rebound stroke. A temperature sensitive bimetal disc forms a valve element that is constructed to seal the rebound passage. A coil spring engages the disc and urges it to a sealed position.

At room temperature the disc is of flat configuration. As the temperature increases within the shock absorber, the disc tends to form a dish shape and exert a force that is cumulative with the force of the coil spring whereby a greater hydraulic pressure is required in the rebound chamber to force fluid through the rebound passages. The automatic increase in spring force and the resulting increase in operating resistance to fluid flow through the rebound passage corresponds to the increase in the fluidity of the hydraulic fluid.

At a reduced temperature, the disc tends to form a dish shape and move away from the valve seat against the force of the coil spring. Under these circumstances, the fluid has a higher viscosity corresponding to the low temperature, however, the change in viscosity is compensated for by a reduction in the minimum hydraulic pressure required to unseat the disc from the rebound passages in the piston.

BRIEF DESCRIPTION OF THE DRAWING

The many objects and advantages of the present invention will become apparent upon consideration of the following detailed description and the accompanying drawing in which an unique hydraulic shock absorber is shown in elevational, sectional view.

DETAILED DESCRIPTION OF THE PREFERRED EMBODIMENT

Figure 1:
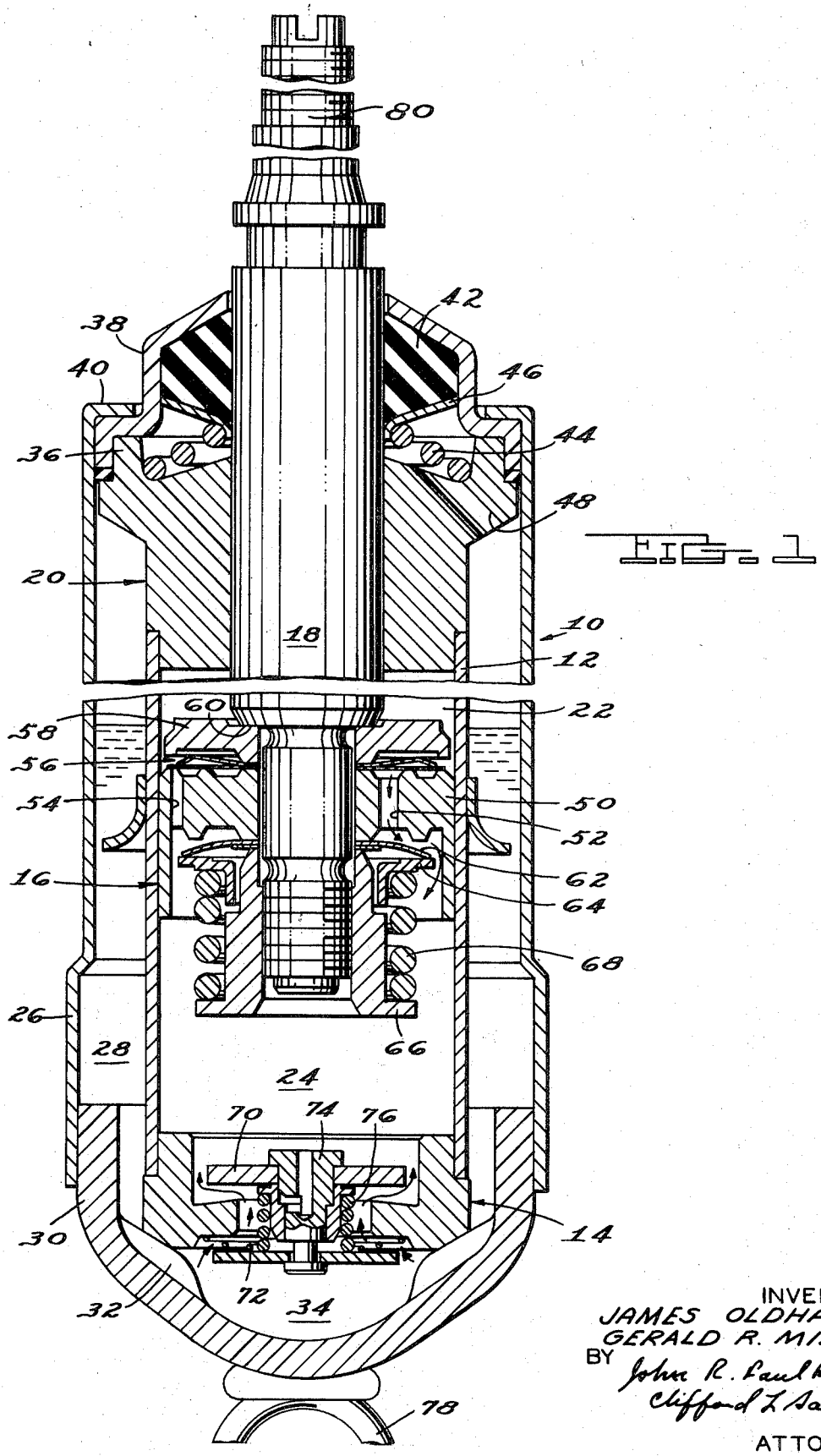

Attention is now directed to the drawing wherein a shock absorber 10 constructed in accordance with the presently preferred embodiment of this invention is disclosed. The shock absorber 10 includes a pressure tube 12 that is closed at its lower end by a foot valve assembly 14. A piston assembly 16 is slidably disposed within the pressure tube 10. A piston rod 18 has its lower end connected to the piston assembly 16 and extends upwardly out of the shock absorber. An annular piston rod guide 20 slidably supports the piston rod 18 and closes the upper end of the pressure tube 12. The piston assembly 16 divides the interior of the pressure tube 12 into rebound and jounce pressure chambers 22 and 24.

A reservoir tube 26 is concentrically disposed about the pressure tube 10 and forms an annular reservoir chamber 28 therewith. The lower end of the reservoir tube 26 is closed by a closure member 30 having a generally cup shape and spaced apart raised portions 32 that engage the foot valve assembly 14. The closure member 30, including its raised portions 32, maintains tube 26 concentric with respect to the pressure tube 10. The spacing of the raised portions 32 permits communication between the reservoir chamber 28 and the area 34 situated directly beneath the foot valve assembly 14.

The piston rod guide 20 has a shoulder portion 36 upon which a cup-shaped upper closure member 38 is seated. The upper end of the reservoir tube 26 is spun over at 40 into engagement with closure member 38 to complete the closure construction. As seen in the drawing, the guide 20 in addition to slidably positioning the piston rod 18 also maintains the reservoir tube 26 concentric with respect to the pressure tube 10. A rubber sealing element 42 of annular configuration surrounds the piston rod 18. The seal 42 is urged upwardly against the closure member 38 by means of a coil spring 44 that is interposed between the guide 20 and a washer 46 that bears against the seal 42. A passage 48 is provided in the rod guide 20 to permit fluid escaping from the rebound chamber 22 into the area above the rod guide 20 to flow back to the reservoir chamber 28. With this construction, the seal 42 is not subjected to the high hydraulic pressures that are present within the jounce and rebound chambers 22 and 24 during operation of the shock absorber.

The piston assembly 16 includes a piston element 50 having a circumferential series of rebound passages 52 formed therein. The element 50 also includes a circumferential series of jounce passages 54 that are spaced outwardly from the rebound passages 52. A spring pressed valve means 56 is constructed to seal the jounce ports 54. The valve means 56 is held in position by a disc 58 that forms a part of the piston assembly. The piston rod 18 is provided with a shoulder 60 against which the disc 58 is seated. The valve means 56 is trapped between the disc 58 and the piston element 50.

The rebound passage 52 is sealed by an annular disc 62 that is formed of bimetal temperature responsive material. The disc 62 is a laminate formed of two layers of metal having different coefficients of expansion.

The disc 62 is held at its inner edge against the piston element 50 by a nut 66 that is threaded onto the reduced diameter end of the piston rod 18. A rebound spring 68 is interposed between a radial flange formed on the nut 66 and a hat-shaped element 64. The spring 68 urges the hat-shaped element 64 and the disc 62 upwardly to seal the rebound passage 52.

The foot valve assembly 14 is of a conventional design and permits the restricted flow of hydraulic fluid between the reservoir chamber 28 and the jounce chamber 24. In the valve assembly 14, a spring pressed replenishing valve element 70 is closed by a spring 72 that controls the flow of fluid into the jounce chamber 24 from the reservoir chamber 28 as the piston 16 travels upwardly during a rebound stroke. Very little pressure is required to overcome the force of spring 72 and to open the replenishing valve element 70. The fluid that flows past valve 70 into the jounce chamber 24 replaces that which had been displaced by the piston rod 18.

During the jounce stroke, compression valve 74 is controlled by a small stiff spring 76. Fluid flows from the jounce chamber 24 to the reservoir chamber 28 through the compression valve 74 during a jounce stroke in an amount equal to the increase in displacement of the piston rod 18 as the piston 16 moves downwardly. The compression valve 74 constitutes one of the principal control means of the shock absorber 10 during the jounce stroke.

The shock absorber illustrated in the drawing is constructed to be interposed between sprung and unsprung members of a vehicle suspension system. A ring 78 is welded to the lower end of the closure member 30 and provides a means for securing that portion of the shock absorber 10 to a vehicle axle or other unsprung component. The upper end 80 of the piston rod 18 is threaded to permit the rod to be secured to a chassis component by means such as a bayonet mounting.

OPERATION

With the shock absorber 10 interposed between sprung and unsprung components, the piston assembly 16 will move downwardly in the pressure tube 10 during a jounce stroke. The jounce and rebound chambers 24 and 22 are filled with hydraulic fluid and as the volume of the chamber 24 is reduced in size, fluid will pass upwardly through the jounce passages 54 in the piston assembly 16. To permit the passage of fluid, the pressure in the chamber 24 will cause the jounce valve means 56 to unseat.

During a jounce stroke, fluid will also be displaced from the jounce chamber 24 in a volume equal to that displaced by the piston rod 18 through the jounce valve 74 of foot valve assembly 14. The orifice in the valve 74 is closed by the coil spring 76 and the pressure must exceed a certain minimum in order to overcome the force of the spring 76. Fluid will flow from the jounce chamber 24 through the valve 74 to the reservoir 28.

During a rebound stroke, the piston 76 will be moving upwardly in the pressure tube 10. Under these circumstances, the jounce passages 54 in the piston 10 will be closed as well as the passage in jounce valve 74 of the foot valve assembly 14. As the piston assembly 16 moves upwardly, fluid within the rebound chamber 22 will be pressurized and will flow through the rebound passages 52 as indicated by the arrows. In order to flow through the rebound passages 52, the pressure within the chamber 22 must exceed a certain minimum in order to cause the bimetal valve element 62 to unseat against the force of the coil spring 68. Fluid will be replenished into the jounce chamber 24 from the reservoir 28 in an amount equal to that which had been displaced by the piston rod 18. The replenishing fluid will flow past the valve element 70 causing the coil spring 72 to be deflected.

The valve element 62 is of bimetal construction so as to be temperature responsive. Under room temperature conditions the valve element 62 is of flat configuration. The coil spring 68 provides the principal force tending to seat the disc 62 in addition to the natural resiliency of the disc 62 to maintain itself flat. As the temperature within the shock absorber 10 increases due to an increase in ambient temperature or due to an increase resulting from the operation of the unit, the disc 62 will tend to assume an upwardly concave configuration and exert a spring force that is cumulative with the force of the spring 68 to maintain the rebound passages 52 closed. Thus, at an elevated temperature the spring forces sealing the passages 52 include both the coil spring 68 and the added resiliency of the disc 62. At the elevated temperature, the hydraulic fluid has a lower viscosity and the greater spring force is required to restrict the flow of fluid. Otherwise, the thinner fluid will more readily flow through the passage 52 and thereby provide reduced resistance to the relative displacement of the shock absorber components.

At a reduced temperature, the disc 62 will assume a downwardly facing concave configuration as illustrated in the drawing. Under these conditions, the spring force of the disc 62 will subtract from the force of the coil spring 68. Less than the total force of the spring 68 will be present to close the passage 52 because of the bimetal valve element 62. As a result, at the reduced temperature a lower pressure will be required to permit the passage of hydraulic fluid from rebound chamber 22 through the passages 52 into the jounce chamber 64. This reduced minimum pressure requirement will correspond to the increase in the viscosity of the fluid within the shock absorber. Thus, the desired damping qualities of the shock absorber will be maintained even though at the reduced temperature the fluid is thicker and would otherwise experience a decrease in its ability to flow through the control orifices.

CONCLUSION

In a hydraulic shock absorber for a motor vehicle constructed in accordance with this invention, means are provided to compensate for a change in fluid viscosity resulting from change in temperature. In a preferred embodiment, the compensating means comprise a bimetal disc that is held against a rebound passage in the piston by a coil spring. The disc is arranged and constructed to either complement or subtract from the force of the normal rebound spring as the temperature of the unit is increased or decreased.

The foregoing description presents the presently preferred embodiment of this invention. Alterations and modifications may occur to those skilled in the art that will come within the scope and spirit of the invention.

We claim:

1. A hydraulic shock absorber for a motor vehicle having a pressure tube, a piston slideable within said pressure tube and dividing the interior of said tube into jounce and rebound pressure chambers, said piston being constructed to be connected to one of a sprung or unsprung vehicle component, said pressure tube being constructed to be connected to the other of said sprung or unsprung component, said piston having fluid passage means constructed for the controlled flow of fluid from one of said chambers to the other of said chambers, said passage means having a fixed cross-sectional area, said piston having an annular valve seat means positioned about and cooperating with said passage means, a flexible resilient bimetal temperature responsive valve element normally engaging said valve seat means to substantially close said passage means, said valve element having a generally annular disc shape and being generally flat at room temperature, a spring constructed and arranged to urge said valve element into engagement with said valve seat means, said valve element being constructed to deflect in a direction to supplement the force of said spring urging said valve element into engagement with said valve seat means when the temperature within said shock absorber increases and to reduce the force of said spring urging said valve element into engagement with said valve seat means when the temperature within said shock absorber decreases.

2. A hydraulic shock absorber for a motor vehicle having a pressure tube, a piston slideable within said pressure tube and dividing the interior of said tube into jounce and rebound pressure chambers, said piston being constructed to be connected to one of a sprung or unsprung vehicle component, said pressure tube being constructed to be connected to the other of said sprung or unsprung component, said piston having a first series of circumferential spaced passages constructed for the controlled flow of fluid from one of said chambers to the other of said chambers, said piston having a second series of circumferentially arranged passages constructed for the controlled flow of fluid from said other chamber to said one chamber, said first and second series of passages being radially spaced apart, said first passages having a fixed cross-sectional area, a flexible resilient laminated bimetal temperature responsive valve element normally situated in a closed position with respect to said first passages, said valve element having a generally annular disc shape and being generally flat at room temperature, a spring constructed and arranged to urge said valve element to a closed position, said valve element being constructed to deflect in a direction to supplement the force of said spring urging said valve element to a closed position when the temperature within said shock absorber increases and to reduce the force of said spring urging said valve element to a closed position when the temperature within said shock absorber decreases, spring biased valve means situated in a closed position with respect to second passages.

3. A hydraulic shock absorber for a motor vehicle having a pressure tube, a piston slideable within said pressure tube and dividing the interior of said tube into jounce and rebound pressure chambers, a reservoir tube surrounding said pressure tube and defining an annular reservoir chamber with the exterior of said pressure tube, valve means constructed and arranged to provide controlled communication between said reservoir chamber and one of said pressure chambers, said piston being constructed to be connected to one of a sprung or unsprung vehicle component, said pressure tube being constructed to be connected to the other of said sprung or unsprung component, said piston having a first series of circumferential spaced passages constructed for the controlled flow of fluid from one of said pressure chambers to the other of said pressure chambers, said piston having a second series of circumferentially arranged passages constructed for the controlled flow of fluid from said other pressure chamber to said one pressure chamber, said first and second series of passages being radially spaced apart, said first passages having a fixed cross-sectional area, said piston having a first annular valve seat means positioned about and cooperating with said first passages, a flexible resilient laminated bimetal temperature responsive valve element normally engaging said first valve seat means to substantially close said first passages, said valve element having a generally annular disc shape and being generally flat at room temperature, a spring constructed and arranged to urge said valve element into engagement with said first valve seat means, said valve element being constructed to deflect in a direction to supplement the force of said spring urging said valve element into engagement with said first valve seat means when the temperature within said shock absorber increases and to reduce the force of said spring urging said valve element into engagement with said first valve seat means when the temperature within said shock absorber decreases, said piston having an annular second valve seat means positioned about and cooperating with said second passages, spring biased valve means normally engaging said second valve seat means.

4. A hydraulic shock absorber for a motor vehicle having a pressure tube, a piston slideable within said pressure tube and dividing the interior of said tube into jounce and rebound pressure chambers, a reservoir tube surrounding and spaced from said pressure tube, said reservoir tube defining an annular reservoir chamber with the exterior of said pressure tube, restrictive passage means constructed and arranged to provide controlled communication between said reservoir chamber and one of said pressure chambers, said piston being constructed to be connected to one of a sprung or unsprung vehicle component, said pressure tube being constructed to be connected to the other of said sprung or unsprung component, said piston having first passage means constructed for the controlled flow of fluid from one of said pressure chambers to the other of said pressure chambers, said piston having second passage means constructed for the controlled flow of fluid from said other pressure chamber to said one pressure chamber, an annular valve seat means positioned about and cooperating with one of said passage means, said one passage means having a fixed cross-sectional flow area, a flexible resilient laminated bimetal temperature responsive valve element normally engaging said valve seat means to substantially close said one passage means, a spring constructed and arranged to exert a force urging said valve element into engagement with said valve seat means, said valve element being constructed to deflect in a direction to supplement the force of said spring when the temperature within said shock absorber increases and to reduce the force of said spring when the temperature within said shock absorber decreases.